US010005135B2

(12) United States Patent
Cheronneau

(10) Patent No.: US 10,005,135 B2
(45) Date of Patent: Jun. 26, 2018

(54) ROTARY BORING TOOL WITH DETACHABLE CUTTING INSERTS AND METHOD FOR MACHINING A CYLINDER BORE OF A COMBUSTION ENGINE

(71) Applicant: RENAULT s.a.s., Boulogne-Billancourt (FR)

(72) Inventor: Gerard Cheronneau, Marcoussis (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 1 day.

(21) Appl. No.: 15/115,724

(22) PCT Filed: Feb. 4, 2015

(86) PCT No.: PCT/FR2015/050253
§ 371 (c)(1),
(2) Date: Aug. 1, 2016

(87) PCT Pub. No.: WO2015/121565
PCT Pub. Date: Aug. 20, 2015

(65) Prior Publication Data
US 2017/0165764 A1 Jun. 15, 2017

(30) Foreign Application Priority Data
Feb. 14, 2014 (FR) ..................... 14 51180

(51) Int. Cl.
*B23C 5/02* (2006.01)
*B23B 41/12* (2006.01)
(Continued)

(52) U.S. Cl.
CPC .............. *B23B 41/12* (2013.01); *B23B 27/06* (2013.01); *B23B 29/0341* (2013.01);
(Continued)

(58) Field of Classification Search
CPC ..... B23B 41/12; B23B 27/06; B23B 29/0341; B23B 2220/445; B23B 2222/04; B23B 2222/14; B23B 2226/125; B23B 2226/315
See application file for complete search history.

(56) References Cited

U.S. PATENT DOCUMENTS

2004/0099137 A1   5/2004   Cadamarteri et al.
2007/0212519 A1   9/2007   Nishimura et al.
(Continued)

FOREIGN PATENT DOCUMENTS

DE   10 2009 028 040 A1   2/2011
WO   2013/142885 A1   10/2013

OTHER PUBLICATIONS

International Search Report dated Apr. 21, 2015 in PCT/FR2015/050253 filed Feb. 4, 2015.
(Continued)

*Primary Examiner* — Daniel Howell
*Assistant Examiner* — Paul M Janeski
(74) *Attorney, Agent, or Firm* — Oblon, McClelland, Maier & Neustadt, L.L.P.

(57) ABSTRACT

A rotary boring tool with detachable inserts, including a rotating insert carrier body including cartridges holding detachable cutting inserts configured to machine a cylinder barrel by axial movement of the tool in the barrel, and including a first cutting insert configured to rough-cut grooves in the material to be machined, a second insert configured to finish the grooves roughly cut by the first insert, and a third levelling insert configured to level rough material generated by the first two inserts.

12 Claims, 2 Drawing Sheets

(51) Int. Cl.
*B23B 27/06* (2006.01)
*B23B 29/034* (2006.01)

(52) U.S. Cl.
CPC ..... *B23B 2220/445* (2013.01); *B23B 2222/04* (2013.01); *B23B 2222/14* (2013.01); *B23B 2226/125* (2013.01); *B23B 2226/315* (2013.01)

(56) References Cited

U.S. PATENT DOCUMENTS

2011/0023777 A1 2/2011 Nishimura et al.
2014/0026492 A1 1/2014 Tatsumi et al.

OTHER PUBLICATIONS

French Search Report dated Oct. 7, 2014 in FR 1451180 filed Feb. 14, 2014.

ROTARY BORING TOOL WITH DETACHABLE CUTTING INSERTS AND METHOD FOR MACHINING A CYLINDER BORE OF A COMBUSTION ENGINE

The present invention relates to the field of boring of metal parts, and more particularly to the operations of finishing a cylinder bore of combustion engines.

The subject of the invention is a rotary boring tool with detachable inserts, comprising a rotary insert-holder body provided with cartridges which retain detachable cutting inserts designed to machine a cylindrical shaft by axial displacement of the tool in the shaft, and a new method for finishing machining a bore in a combustion engine housing using this rotary machining tool.

This invention has a preferential, but not exclusive, application in the machining and finishing of cylinder bores in mechanical parts, such as metal housing-cylinders of internal combustion engines.

These operations are generally carried out by means of tools with detachable, single- or multi-tooth inserts, which are designed to machine and finish boring operations in cast-iron or aluminum. Operations of rough cutting, then finishing, are then carried out on the cast iron sleeve in a plurality of passages of a tool, with some inserts which are dedicated to the rough machining, and others which are dedicated to the finishing passages.

A tapping tool is known from publication DE 1 281 803 provided with a single detachable cutting insert, which has a first cutting ridge in the form of a triangular tooth, which can hollow out a thread in a material to be tapped, followed by a second planing ridge in the form of an elongate tooth. An insert of this type makes it possible to tap a female thread in a single tool passage, by levelling the peaks of material raised by the cutting ridge, by means of the planing ridge. However, the tool, which is designed to produce female tappings for threaded screws, is not accurate enough for machining of engine cylinder shafts, which involves compliance with very precise dimensions on the grooves hollowed in the metal, for good lubrication of the cylinders. In fact, a surface which is sufficiently flattened to limit friction, whilst making it possible to apply a covering in order to regularize the depth of the hollow grooves, is required. This surface state cannot be obtained with the tool described in this publication, the single insert of which does not ensure the level of precision required.

The objective of the present invention is to provide grooves by means of a tool equipped with detachable inserts which are arranged especially to obtain the level of quality of surface state, and comply exactly with the dimensions which are imposed by the design offices for the cylinder shafts.

For this purpose, it proposes that the tool comprises a first cutting insert which can rough cut grooves in the material to be machined, a second insert for finishing of the grooves rough-cut by the first insert, and a third, planing insert, which can flatten the peaks of material raised by the two first inserts.

Preferably, the three inserts are arranged in steps around the tool-holder body, such as to penetrate in succession in the material.

During a single passage of the tool, the new machining method carries out simultaneous operations of rough cutting of grooves, cutting of grooves, and flattening of the surface, which are carried out by inserts dedicated respectively to each of these operations.

The invention will be better understood by reading the following description of a non-limiting embodiment thereof, in association with the appended drawings, in which.

Figure 1:
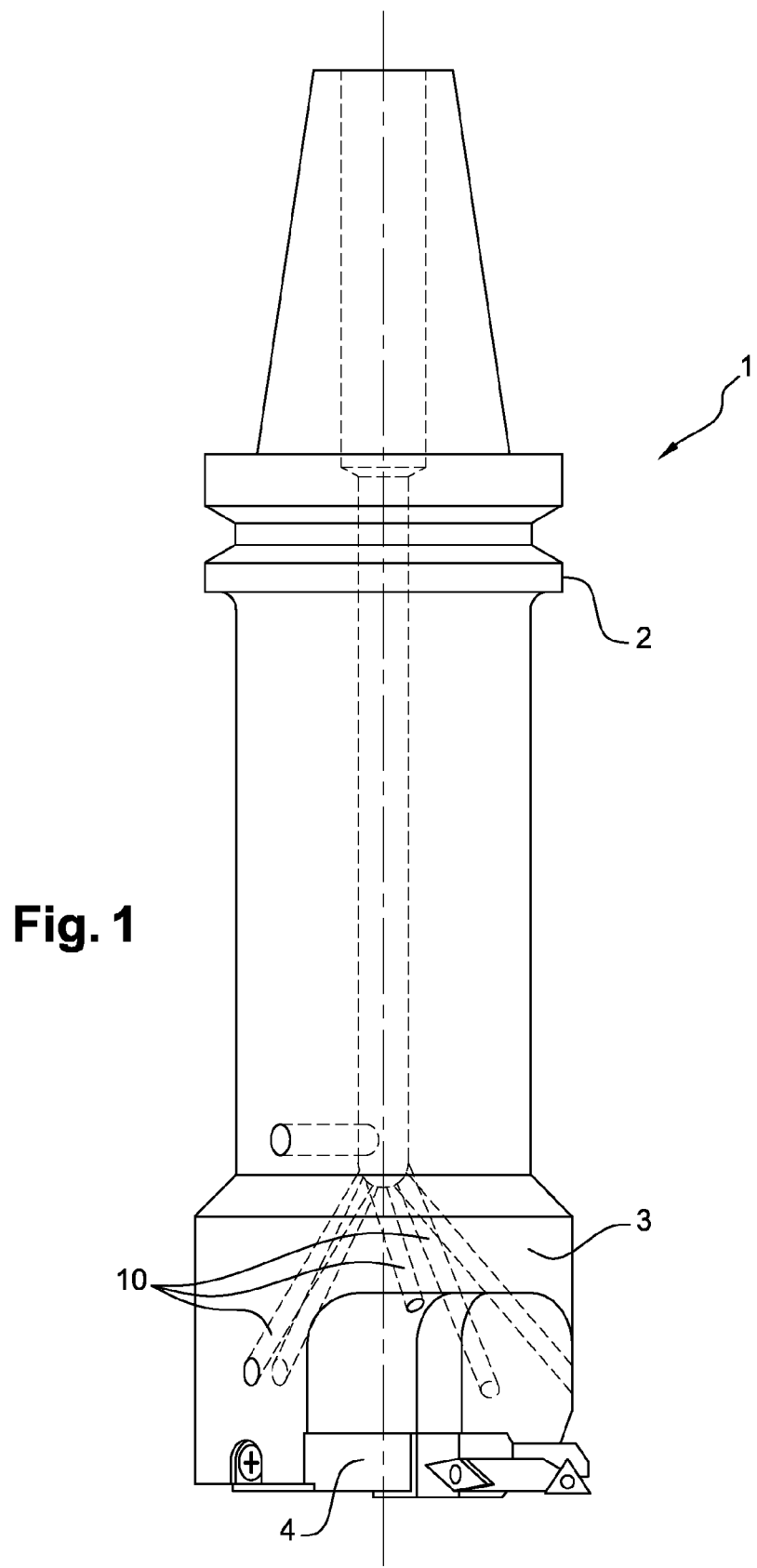
FIG. 1 is an overall view of a rotary tool according to the invention.
Figure 2:
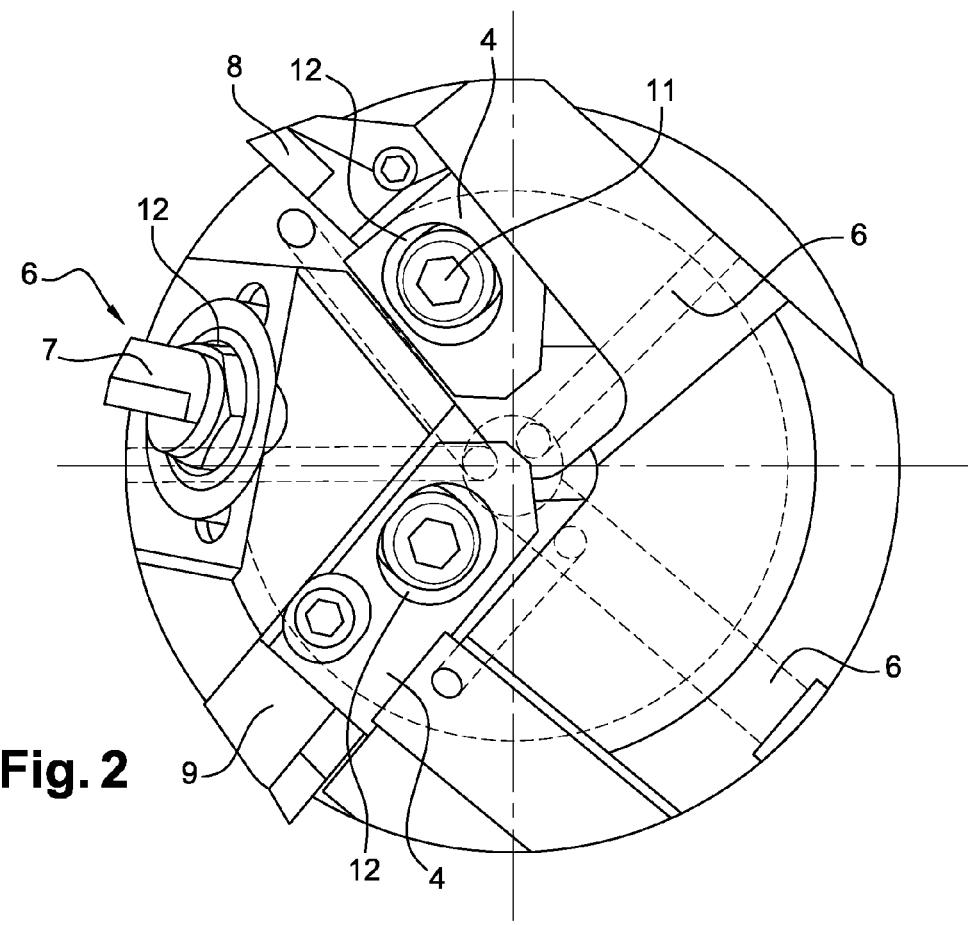
FIG. 2 is a view from below of FIG. 1.

The rotary tool in FIG. 1 is in the form of a standard insert-holder 1, with a shoulder 2 for locking onto the drive machine (not represented), and an insert-holder body 3. The tool has inner holes 10 for spraying of the cutting inserts 7, 8, 9, in order to cool them. The tool-holder 3 supports a plurality of cartridges 4, or insert-holder bars (three in the example described). The cartridges, or bars 4, support three different cutting inserts, so-called for rough cutting 7, finishing 8, and planing 9, which can be seen in FIGS. 2 and 3. The position of the cartridges can be adjusted by adjustment screws 6, which are shown in FIG. 2, making it possible to adjust the cutting angle of the leading ridges of each insert. The inserts are tightened in position on the body 3 by means of tightening screws 11.

Figure 3:
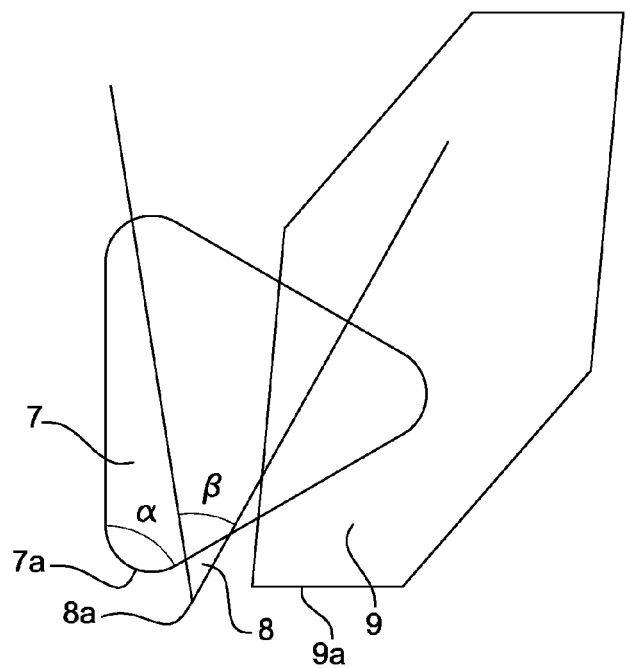
FIG. 3 shows the radial stepping of the inserts on the tool.

FIG. 3 shows that the rough-cutting insert 7 is slightly recessed in the radial direction, relative to the two others. The three inserts 7, 8, 9 are preferably fitted stepped around the tool-holder 3, such that they penetrate in succession in the order: rough cutting, cutting and finishing, during the penetration of the tool in the material to be machined.

The inserts 7, 8, 9 have a central passage hole 12 for their screw 11 for tightening onto the cartridge 4. The first insert 7 is a so-called "groove-forming" rough-cutting insert with a triangular form, which can hollow a rough groove in the material machined. The second insert 8 is also a so-called "groove-forming" insert. It has a cutting tooth 8a with a triangular form, the pointed angle □ of which is narrower than the cutting angle □ of the first insert, such as to penetrate into the groove opened by the first insert, in order to carry out the finishing of the groove. Finally, the third insert 9 has a flat planing side 9a in the form of an elongate blade, which, during its passage, is designed to flatten the peaks of material raised by the preceding inserts in the metal mass machined.

For the aforementioned applications of the invention, the cutting insert 8 has a triangular cutting ridge, the pointed angle of which is between 35° and 40°, whereas the planing insert 9 preferably has a rhombic form.

The ridges 7a, 8a, 9a of the inserts 7, 8, 9 can be made of different materials, depending on the materials to be machined. They can be made entirely of metal carbide (including the cutting and planing ridges), and preferably tungsten carbide, in order to machine steel.

In order to machine cast iron, for example in the cylinder shaft sleeves, they are preferably made of cubic boron nitride (CBN). Machining of aluminum requires polycrystalline diamonds (PCD).

The rough-cutting insert 7 has three cutting faces which can be used in succession by turning the insert on the body 3. The cutting insert 8 has two faces: these inserts can be turned on their cartridge 4 in order to use both their cutting ridges in succession. The arrangement of the inserts in step form permits progressive attack of the material machined, thus reducing the cutting force of each insert, and therefore its wear.

As previously stated, the machining of the bores of engines requires a plurality of operations, in particular when they consist of different materials, i.e. at least one rough cutting operation and a finishing step, followed by a planing step. Thus, when the tool bears a single type of insert, a plurality of passages of this tool are necessary. On the other hand, according to the invention, with inserts which are dedicated respectively to each passage, that is, to the rough machining (rough cutting), finishing and planing, a single tool passage is sufficient.

The invention thus makes it possible to obtain satisfactory "groove forming" with a surface state which is prominent during cutting, and flattened in the cylinder bores, which in particular are made of cast iron or aluminum, in a single passage of the tool, thus ensuring the work of rough cutting, cutting and flattening of the grooves and the planing thereof, or "planing". The new method for finishing machining a cylinder bore in a combustion engine housing using the rotary machining tool proposed thus carries out simultaneously, during the same passage of the tool, operations of rough cutting of grooves, cutting of grooves, and surface flattening, thanks to the different inserts 7, 8, 9 which are dedicated to each of these operations. The machined surface then makes it possible to apply a covering in order to regularize the depth of the hollow grooves. The application of the process on the machined surface, with the tool proposed, is an efficient means for obtaining ultimately the regularity required.

The invention claimed is:

1. A rotary boring tool with detachable inserts, comprising:
    a rotary insert-holder body including cartridges which retain detachable cutting inserts configured to machine a cylindrical shaft by axial displacement of the tool in the shaft;
    a first insert to rough cut grooves in a material to be machined, the first insert including a first triangular cutting ridge including two surfaces forming a first pointed angle;
    a second insert to finish the grooves rough-cut by the first insert, the second insert including a second triangular cutting ridge including two surfaces forming a second pointed angle that is different from the first pointed angle; and
    a third, planing insert to flatten peaks of material raised by the first and second inserts, the third insert including a flat cutting ridge,
    wherein the first triangular cutting ridge and the second triangular cutting ridge are oriented to cut through the material, and the flat cutting ridge is oriented to flatten the material.

2. The rotary boring tool as claimed in claim 1, wherein the first, second, and third inserts are arranged in steps around the tool-holder body, to penetrate the material in succession.

3. The rotary boring tool as claimed in claim 1, wherein the triangular cutting ridge of the second insert has a pointed angle between 35° and 40°.

4. The rotary boring tool as claimed in claim 1, wherein the third, planing insert has a rhombic form.

5. The rotary boring tool as claimed in claim 1, wherein the cutting ridges of the inserts are made of metal carbide.

6. A detachable cutting insert as claimed in claim 1, wherein the cutting ridges of the inserts are made of cubic boron nitride (CBN).

7. The detachable cutting insert as claimed in claim 1, wherein the cutting ridges of the inserts are made of polycrystalline diamonds.

8. A method for finishing machining a cylinder bore in a combustion engine housing using a rotary machining tool as claimed in claim 1, wherein, during a same passage of the tool, the machining tool combines simultaneous operations of rough cutting of grooves, cutting of grooves, and surface flattening, carried out respectively by the first, second, and third inserts which are dedicated respectively to each of these operations.

9. The method for finishing machining as claimed in claim 8, wherein the machined surface makes it possible to apply a covering to regularize depth of the hollow grooves.

10. The rotary boring tool as claimed in claim 1, wherein the cutting ridge of the second insert is narrower than the cutting ridge of the first insert.

11. The rotary boring tool as claimed in claim 1, wherein the first insert is radially recessed relative to the second insert and the third insert.

12. A rotary boring tool with detachable inserts, comprising:
    a rotary insert-holder body including cartridges which retain detachable cutting inserts configured to machine a cylindrical shaft by axial displacement of the tool in the shaft;
    a first insert to rough cut grooves in a material to be machined, the first insert including a first cutting formed by two surfaces intersecting at a first pointed angle;
    a second insert to finish the grooves rough-cut by the first insert, the second insert including a second cutting edge formed by two surfaces intersecting at a second pointed angle that is different from the first pointed angle; and
    a third, planing insert to flatten peaks of material raised by the first and second inserts, the third insert including a flattening edge,
    wherein the first cutting edge and the second cutting edge are oriented to cut through the material, and the flattening edge is oriented to flatten the material.

* * * * *